United States Patent
Chen et al.

(10) Patent No.: US 9,671,830 B2
(45) Date of Patent: Jun. 6, 2017

(54) ELECTRONIC DEVICE HAVING STAND MODULE

(71) Applicants: Yi-Hung Chen, Taipei (TW);
Tzu-Chien Lai, Taipei (TW);
Cheng-Ya Chi, Taipei (TW)

(72) Inventors: Yi-Hung Chen, Taipei (TW);
Tzu-Chien Lai, Taipei (TW);
Cheng-Ya Chi, Taipei (TW)

(73) Assignee: COMPAL ELECTRONICS, INC., Taipei (TW)

(*) Notice: Subject to any disclaimer, the term of this patent is extended or adjusted under 35 U.S.C. 154(b) by 0 days.

(21) Appl. No.: 15/016,263

(22) Filed: Feb. 5, 2016

(65) Prior Publication Data

US 2016/0230924 A1   Aug. 11, 2016

Related U.S. Application Data

(60) Provisional application No. 62/112,645, filed on Feb. 6, 2015.

(51) Int. Cl.
| | |
|---|---|
| *G06F 1/16* | (2006.01) |
| *F16M 13/00* | (2006.01) |
| *F16M 11/10* | (2006.01) |
| *F16B 1/00* | (2006.01) |

(52) U.S. Cl.
CPC .......... *G06F 1/166* (2013.01); *F16M 11/10* (2013.01); *F16M 13/005* (2013.01); *F16B 2001/0035* (2013.01)

(58) Field of Classification Search
USPC ................................... 361/679.59
See application file for complete search history.

(56) References Cited

U.S. PATENT DOCUMENTS

| | | | | |
|---|---|---|---|---|
| 6,053,589 A * | 4/2000 | Lin | .......... | G06F 1/166 |
| | | | | 312/271 |
| 6,097,595 A * | 8/2000 | Cipolla | .......... | G06F 1/1616 |
| | | | | 248/685 |
| 6,570,627 B1 * | 5/2003 | Chang | .......... | F16M 11/10 |
| | | | | 248/917 |
| 6,807,050 B1 * | 10/2004 | Whitehorn | .......... | G06F 1/1632 |
| | | | | 361/679.23 |
| 7,299,580 B2 * | 11/2007 | Wang | .......... | F16M 11/10 |
| | | | | 248/461 |
| 7,916,478 B2 * | 3/2011 | Tu | .......... | F16M 11/10 |
| | | | | 248/398 |

(Continued)

FOREIGN PATENT DOCUMENTS

| | | |
|---|---|---|
| TW | M292713 | 6/2006 |
| TW | I310468 | 6/2009 |

*Primary Examiner* — Adrian S Wilson
(74) *Attorney, Agent, or Firm* — Jianq Chyun IP Office

(57) ABSTRACT

An electronic device including a main body and a stand module is provided. The stand module includes a supporting component and a sliding component. The supporting component is pivoted to the main body. The sliding component is slidably disposed to the main body and has an end. The sliding component is adapted to slide to a first position such that the end protrudes out of the main body. The end is adapted to receive an external force to move inside the main body, such that the sliding component slides to a second position and drives the supporting component to expand from the main body.

15 Claims, 11 Drawing Sheets

(56) References Cited

U.S. PATENT DOCUMENTS

| | | | | |
|---|---|---|---|---|
| 8,724,319 B2* | 5/2014 | Shih | ................. | F16M 11/10 361/679.05 |
| 8,922,995 B2* | 12/2014 | Su | ................. | F16M 11/10 248/917 |
| 9,031,621 B2* | 5/2015 | Cheng | ................. | F16M 11/041 361/679.01 |
| 9,047,058 B2* | 6/2015 | Yu | ................. | G06F 1/1679 |
| 2003/0025063 A1* | 2/2003 | Chen | ................. | F16M 11/00 248/652 |
| 2003/0132921 A1* | 7/2003 | Torunoglu | ................. | G06K 9/224 345/173 |
| 2004/0201871 A1* | 10/2004 | Risheq | ................. | G06F 1/1618 358/474 |
| 2006/0050471 A1* | 3/2006 | Chen | ................. | G06F 1/1601 361/679.22 |
| 2009/0321609 A1* | 12/2009 | Wang | ................. | G06F 1/1626 248/685 |
| 2010/0014229 A1* | 1/2010 | Horie | ................. | G06F 1/16 361/679.01 |
| 2010/0284146 A1* | 11/2010 | Hsu | ................. | F16M 13/00 361/679.59 |
| 2011/0279993 A1* | 11/2011 | Su | ................. | F16M 11/10 361/807 |
| 2012/0106054 A1* | 5/2012 | Royz | ................. | F16M 11/10 361/679.3 |
| 2012/0188693 A1* | 7/2012 | Chiang | ................. | F16M 11/10 361/679.01 |
| 2012/0218699 A1* | 8/2012 | Leung | ................. | G06F 1/1616 361/679.08 |
| 2014/0167431 A1* | 6/2014 | Enkerlin | ................. | F16M 11/10 294/142 |

\* cited by examiner

ELECTRONIC DEVICE HAVING STAND MODULE

CROSS-REFERENCE TO RELATED APPLICATION

This application claims the priority benefits of U.S. provisional application Ser. No. 62/112,645, filed on Feb. 6, 2015. The entirety of the above-mentioned patent application is hereby incorporated by reference herein and made a part of this specification.

BACKGROUND OF THE INVENTION

1. Field of the Invention

The invention relates to an electronic device. More particularly, the invention relates to an electronic device having a stand module.

2. Description of Related Art

With rapid progress in electronic technology, flat panel displays have become the mainstream among various displays and replaced cathode ray tube (CRT) displays. In flat panel displays, liquid crystal display (LCD) technology has matured and become popular. Liquid crystal display technology may be applied in electronic devices such as LCD monitors, LCD TVs, or all-in-one personal computers (PC).

In all-in-one PCs, for example, in order for the user to comfortably view the display, the back of the all-in-one PC may include a stand. The stand may expand for the all-in-one PC to be supported on a desktop, so that the display of the all-in-one PC may be tilted at a suitable angle for the user to view. However, current stands for all-in-one PCs need to be manually adjusted in order to expand or retract, which causes inconvenience when being used.

SUMMARY OF THE INVENTION

The invention provides an electronic device having a stand module for convenient use.

The electronic device of the invention includes a main body and a stand module. The stand module includes a supporting component and a sliding component. The supporting component is pivoted to the main body. The sliding component is slidably disposed to the main body and has an end. The sliding component is adapted to slide to a first position such that the end protrudes out of the main body. The end is adapted to receive an external force to move inside the main body, such that the sliding component slides to a second position and drives the supporting component to expand from the main body.

In an embodiment of the invention, the main body is adapted to be placed on a work surface so that the work surface applies the external force towards the end. The supporting component expanded from the main body is adapted to support the main body on the work surface.

In an embodiment of the invention, when the main body and the end of the sliding component are separated from the work surface, the sliding component automatically slides from the second position to the first position by gravity, and the supporting component automatically retracts to the main body by gravity.

In an embodiment of the invention, the sliding component is adapted to slide from the second position to the first position by gravity, so that the supporting component is released by the sliding component to retract to the main body.

In an embodiment of the invention, the supporting component is adapted to retract to the main body by gravity so as to drive the sliding component to slide from the second position to the first position.

In an embodiment of the invention, the stand module includes a prop. The prop is connected to the sliding component. The sliding component is adapted to slide to the second position to drive the prop to push the supporting component, so that the supporting component expands from the main body.

In an embodiment of the invention, the main body includes at least one sliding slot and at least one guiding slot. The guiding slot is tilted with respect to the sliding slot. The sliding component is slidably disposed at the sliding slot. The prop is slidably disposed at the guiding slot and props against the sliding component. The sliding component sliding toward the second position is adapted to drive the prop to be guided by the guiding slot to push the supporting component.

In an embodiment of the invention, the stand module includes at least one column. The column passes through the sliding slot to be connected to the sliding component.

In an embodiment of the invention, the stand module includes at least one column. The column passes through the guiding slot to be connected to the prop.

In an embodiment of the invention, the prop is pivoted to the sliding component and is adapted to rotate with respect to the sliding component and push the supporting component.

In an embodiment of the invention, the main body includes a guiding tilted surface. The sliding component sliding to the second position is adapted to drive the prop to be guided by the guiding tilted surface to push the supporting component.

In an embodiment of the invention, the stand module includes two magnetic components. The two magnetic components are respectively disposed on the sliding component and the supporting component. The sliding component in the first position is adapted to restrict the supporting component to be retracted to the main body by a magnetic attraction between the two magnetic components. The sliding component in the second position is adapted to restrict the supporting component to be expanded from the main body by a magnetic repulsion between the two magnetic components.

In an embodiment of the invention, the stand module includes an elastic component. The elastic component is connected to the supporting component. The supporting component is adapted to be retracted to the main body by the elasticity of the elastic component.

In an embodiment of the invention, the sliding component includes a protruding portion. The sliding component is adapted to slide and drive the protruding portion to push the supporting component, so that the supporting component is expanded from the main body.

Based on the above, in the electronic device of the invention, the stand module includes a sliding component corresponding to a supporting component. When the user places the main body of the electronic device on a working surface so that sliding component of the stand module contacts the working surface, the sliding component is pushed by the working surface so as to move inwards the main body and drive the supporting component. This way the supporting component expands to support the main body on the working surface. In addition, when the main body and the end of the sliding component are separated from the work surface, the sliding component moves downwards towards the outside of the main body by gravity, and the supporting component retracts to the main body by gravity. Thus, the user only needs to place the main body of the electronic device on the working surface, and the stand module will automatically drive the supporting component to expand. In addition, the user only needs to separate the main body of the electronic device from the working surface, and the supporting component will automatically retract. Thus, the use of the electronic device with the stand module is more convenient.

To make the above features and advantages of the present invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
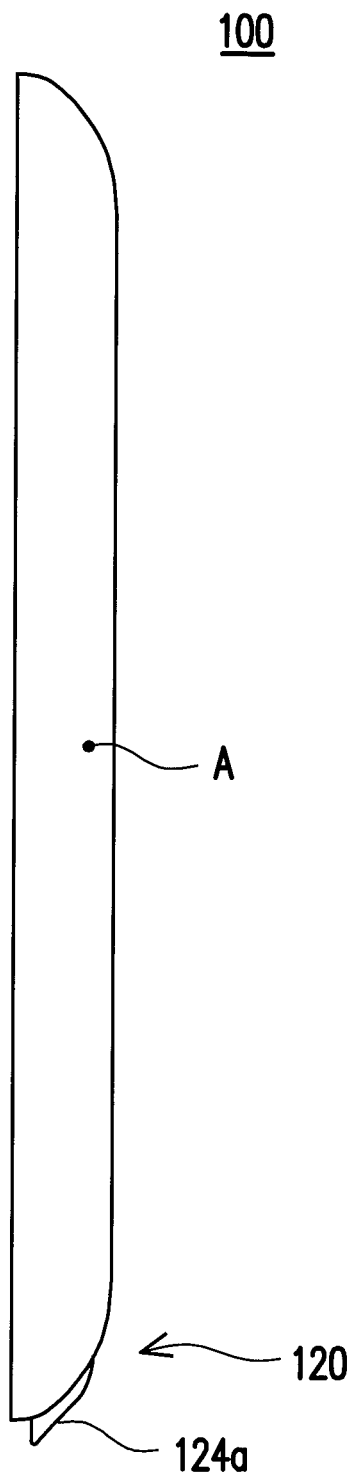
FIG. 1A is a side view of an electronic device according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Figure 1B:
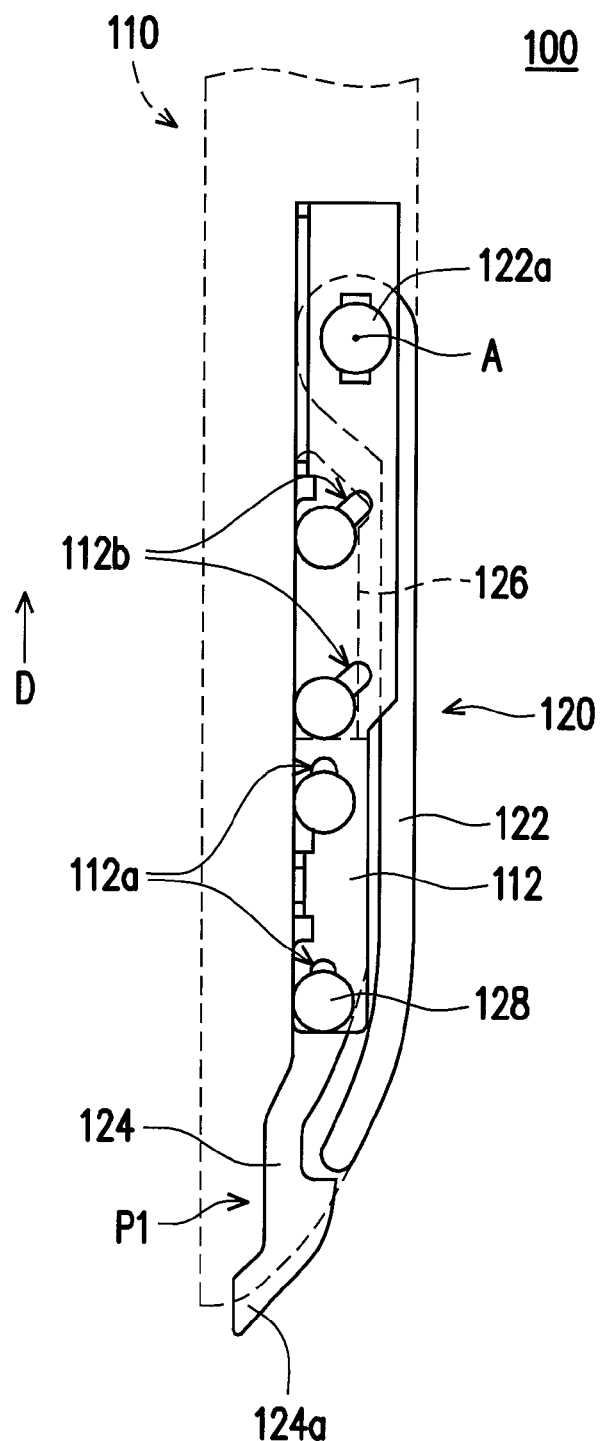
FIG. 1B illustrates a partial structure of the electronic device of FIG. 1A.
Figure 1C:
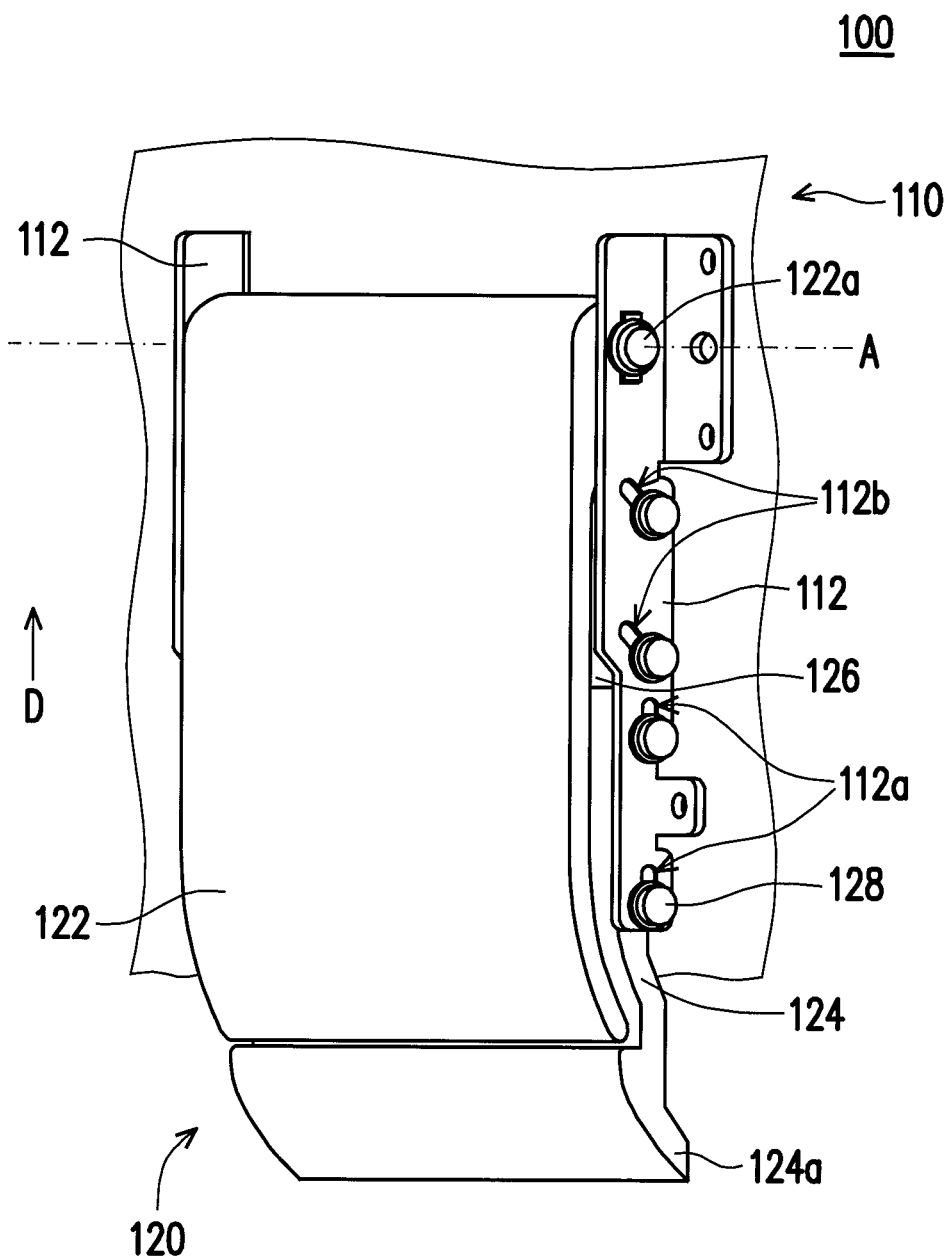
FIG. 1C is a three-dimensional view illustrating parts of the components of the electronic device of FIG. 1A.

FIG. 1A is a side view of an electronic device according to an embodiment of the invention. FIG. 1B illustrates a partial structure of the electronic device of FIG. 1A. FIG. 1C is a three-dimensional view illustrating parts of the components of the electronic device of FIG. 1A. Referring to FIGS. 1A, 1B, and 1C, an electronic device 100 of the embodiment is, for example, an all-in-one personal computer (PC) that includes a main body 110 and a stand module 120. The stand module 120 includes a supporting component 122 and a sliding component 124. The supporting component 122 is pivoted to the main body 110 along the axis A. The sliding component 124 is slidably disposed to the main body 110 along the direction D, and includes an end 124a. The sliding component 124 is adapted to slide to a first position P1 (referenced in FIG. 1B) as shown in FIGS. 1A, 1B, and 1C, such that the end 124a protrudes out of the main body 110.

Figure 2A:
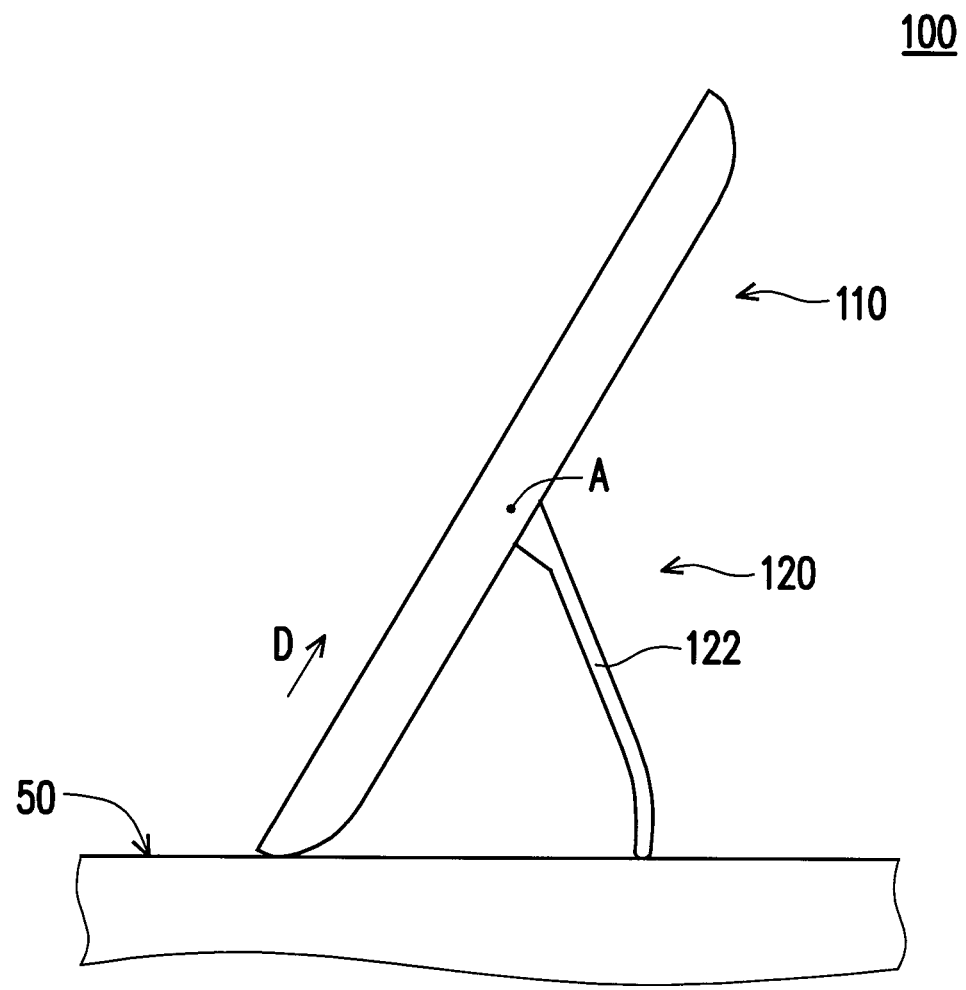
FIG. 2A is a schematic view showing the supporting component of FIG. 1A expanded from the main body.
Figure 2B:
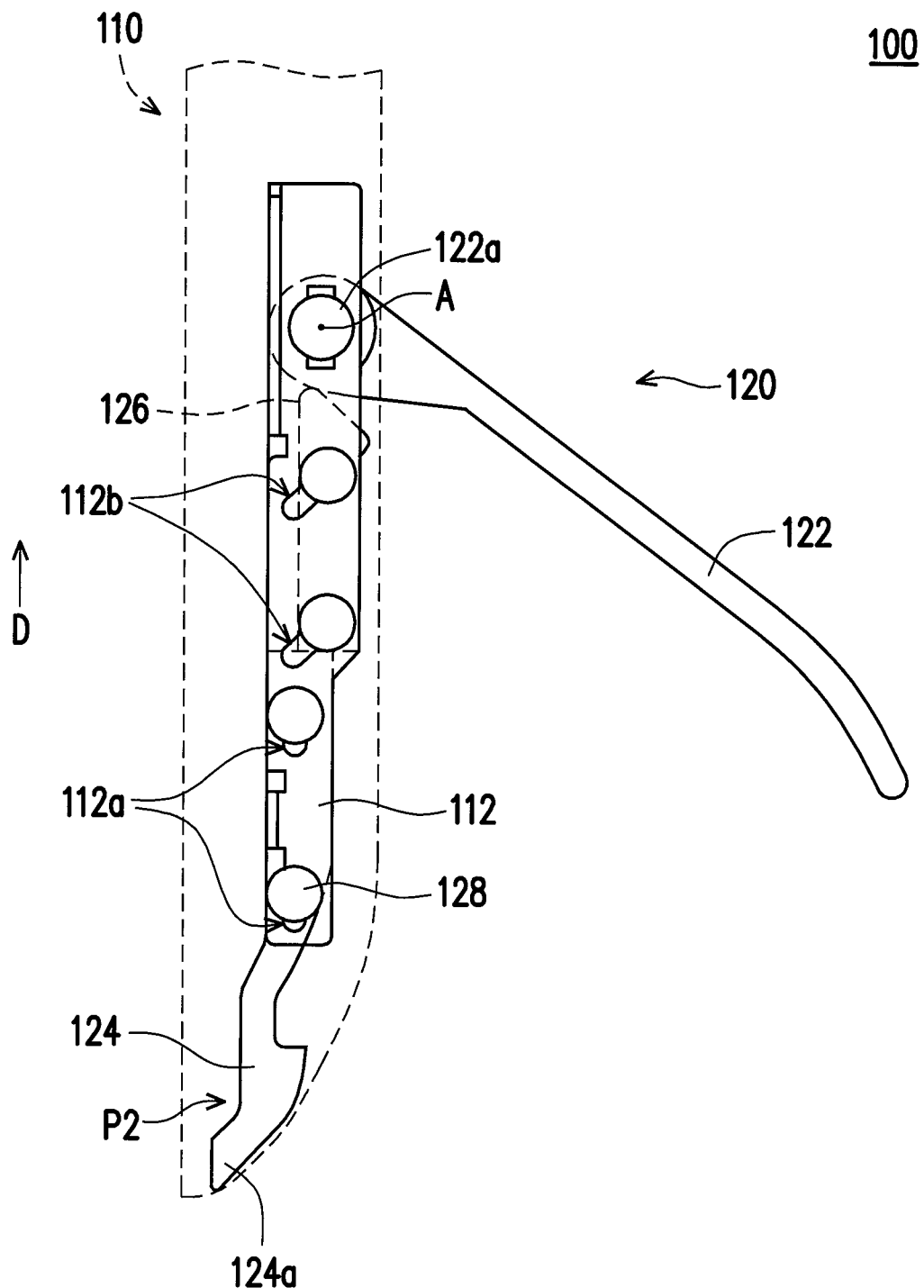
FIG. 2B illustrates a partial structure of the electronic device of FIG. 2A.
Figure 2C:
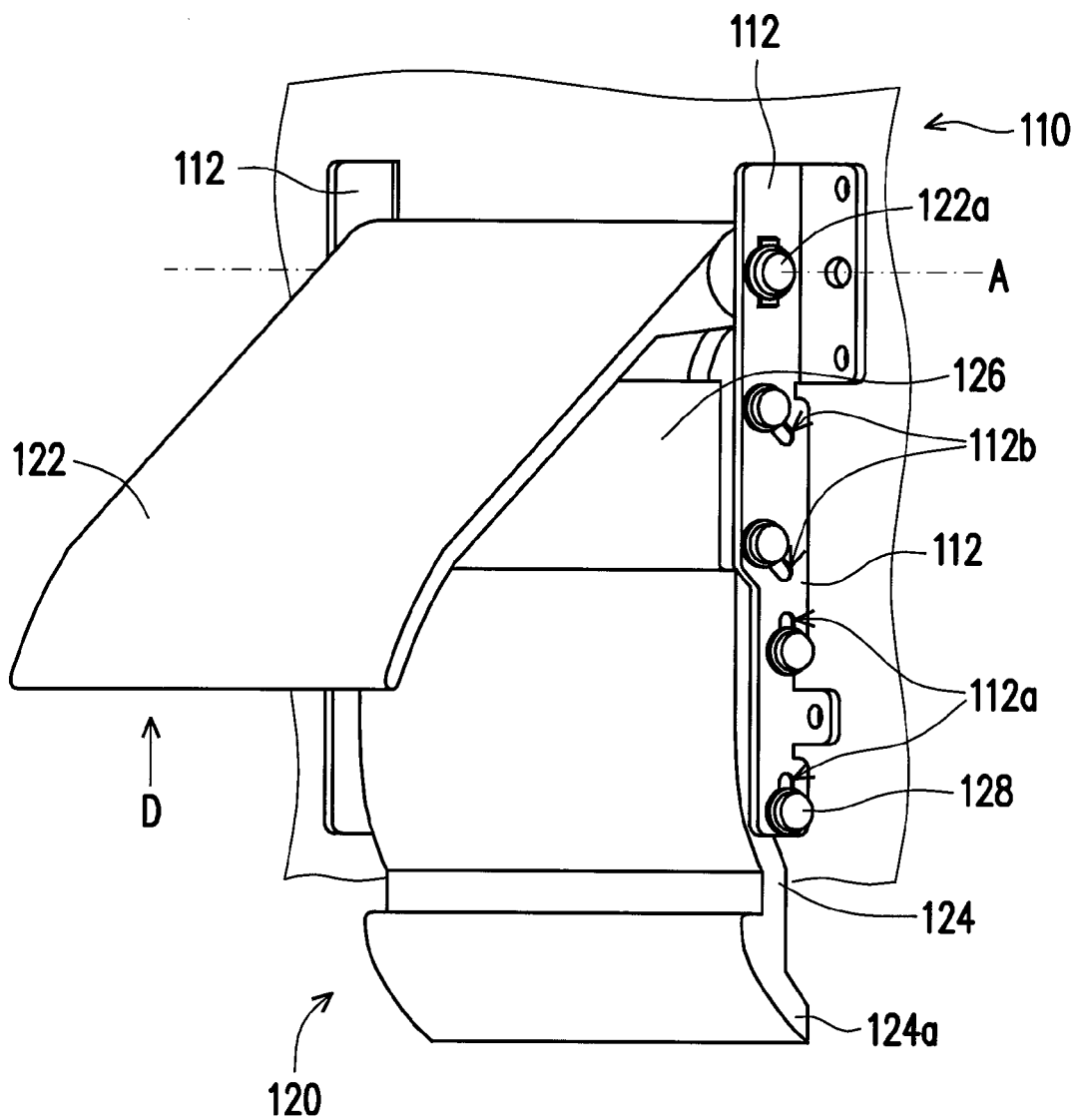
FIG. 2C is a three-dimensional view illustrating parts of the components of the electronic device of FIG. 2A.

FIG. 2A is a schematic view showing the supporting component of FIG. 1A expanded from the main body. FIG. 2B illustrates a partial structure of the electronic device of FIG. 2A. FIG. 2C is a three-dimensional view illustrating parts of the components of the electronic device of FIG. 2A. Referring to FIGS. 2A, 2B, and 2C, when the user places the main body 110 of the electronic device 110 onto a work surface 50 (such as a desktop, as shown in FIG. 2A), causing the sliding component 124 of the stand module 120 to contact the work surface 50, the work surface 50 pushes the end 124a of the sliding component 124 and applies an external force to the end 124a. This way, the end 124a receives the external force and moves inside the main body 110. As a result, the sliding component 124 slides to the second position P2 (shown in FIG. 2B) and drives the supporting component 122 to expand from the main body 110. The supporting component 122 expanded from the main body 110 supports the main body 110 on the work surface 50.

Through the configuration and actuating method described above, the user only needs to place the main body 110 of the electronic device 100 on the working surface 50, and the stand module 120 will automatically drive the supporting component 122 to expand. Thus, the use of the electronic device 100 with the stand module 120 is more convenient.

When the user does not use the stand module 120, the main body 110 of FIG. 2A may be separated from the work surface 50. At this point, the main body 110 and the end 124a of the sliding component 124 are separated from the work surface 50. The supporting component 122 will automatically retract to the main body by gravity. The sliding component 124 will automatically slide from the second position P2 shown in FIG. 2B to the first position P1 shown in FIG. 1B by gravity. This way, the supporting component 122 is released by the sliding component 124 to retract to the main body 110. The sliding component 124 correspondingly is driven by the supporting component 122 to return to the first position P1, and be in the status shown in FIGS. 1A, 1B, and 1C.

Referring to FIGS. 1B and 1C, the stand module 120 of the embodiment includes a prop 126. The prop 126 is connected to the sliding component 124. When the main body 110 of the electronic device 100 is on the work surface 50 as seen in FIG. 2A, the sliding component 124 is adapted to slide to the second position P2 as seen in FIG. 2B through the external force applied by the work surface 50. This then drives the prop 126 to push the supporting component 122, so that the supporting component 122 expands from the main body 110.

Figure 3:
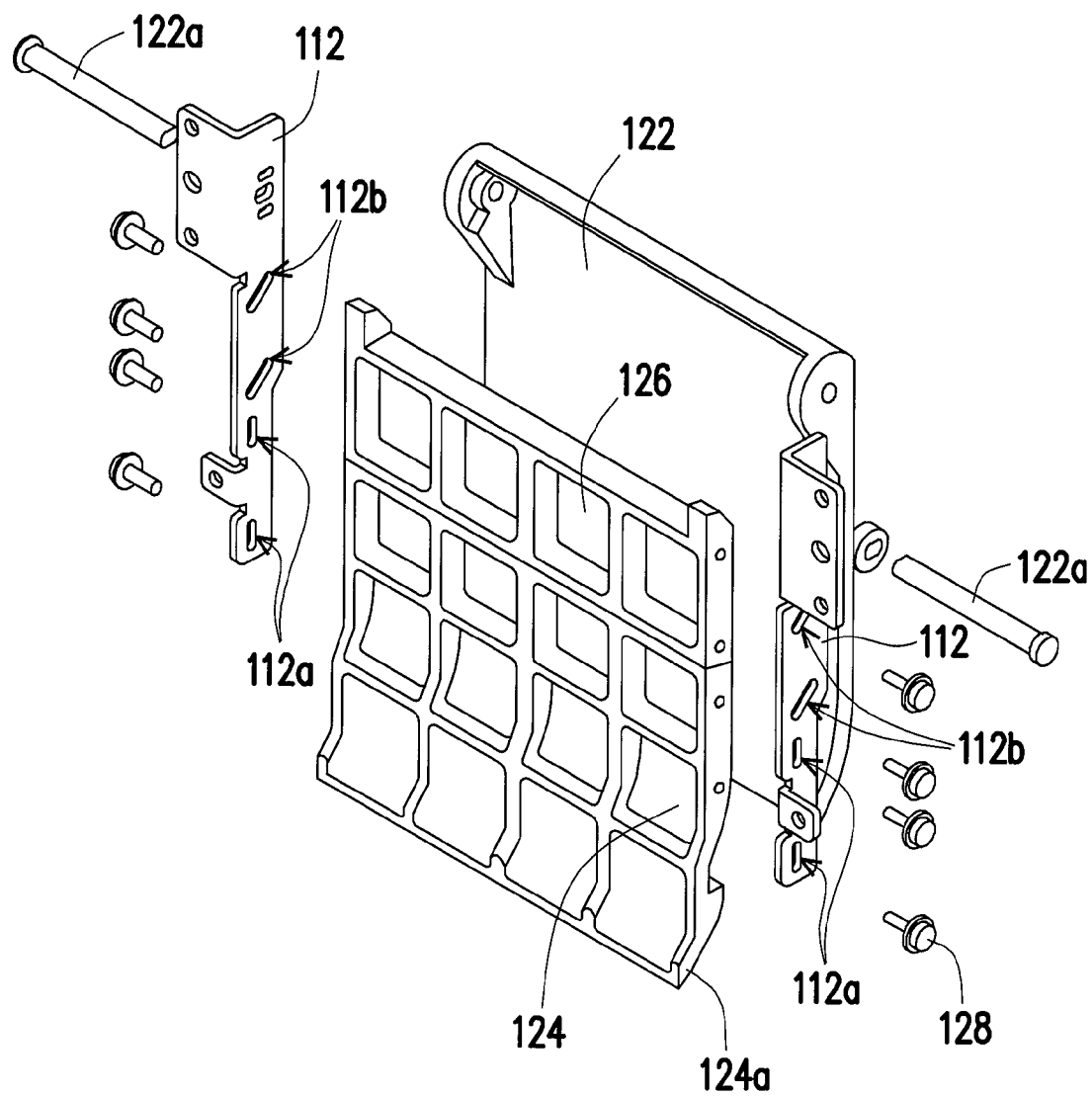
FIG. 3 is an exploded view of the components of the electronic device of FIG. 1C.

FIG. 3 is an exploded view of the components of the electronic device of FIG. 1C. Referring to FIG. 1C and FIG. 3, in detail, the main body 110 of the embodiment includes two support frames 112 fixed to the back side. Each of the support frames 112 includes a plurality of sliding slots 112a and a plurality of guiding slots 112b. Each of the guiding slots 112b are tilted with respect to each of the sliding slots 112a. The sliding component 124 is slidably disposed at the sliding slots 112a. The prop 126 is slidably disposed at the guiding slots 112b and leans against a top end of the sliding component 124. When the sliding component 124 slides along the sliding slots 112a from the first position P1 shown in FIG. 1B toward the second position P2 shown in FIG. 2B, the sliding component 124 pushes up against the prop 126. This drives the prop 126 to be guided by the guiding slots 112*b* and generate displacement in a direction perpendicular to the direction D. Thus, the supporting component 122 is pushed by the prop 126 to be expanded.

In the embodiment, the stand module 120 includes a plurality of columns 128. Some of the columns 128 respectively pass through the sliding slots 112*a* and are connected to the sliding component 124. This way, the sliding component 124 is slidably disposed to the frames 112 of the main body 110 through the configuration of the sliding slots 112*a* and the corresponding columns 128. The other columns 128 respectively pass through the guiding slots 112*b* and are connected to the prop 126. This way, the prop 126 is slidably disposed to the frames 112 of the main body 110 through the configuration of the guiding slots 112*b* and the corresponding columns 128. In other embodiments, the sliding component 124 and the prop 126 may be disposed to the main body through other suitable methods, and the invention is not limited thereto. In addition, the supporting component 122 of the embodiment is, for example, pivoted to the frames 112 and the main body 110 through the rotating shaft 122*a* of FIG. 3. However, the invention is not limited thereto. The supporting component 122 may be pivoted to the main body 110 through other suitable methods.

Figure 4:
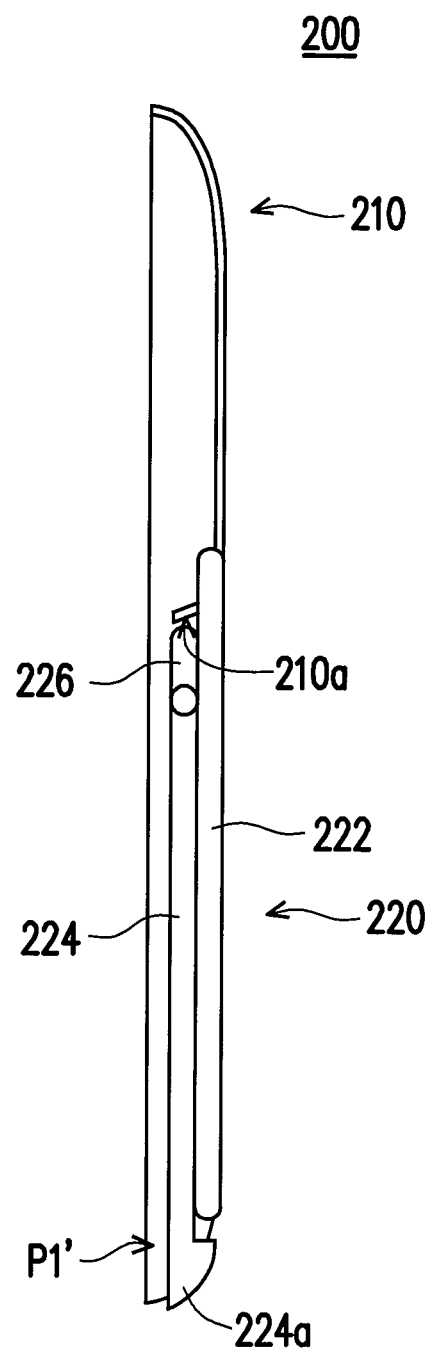
FIG. 4 is a schematic view of an electronic device of another embodiment of the invention.
Figure 5:
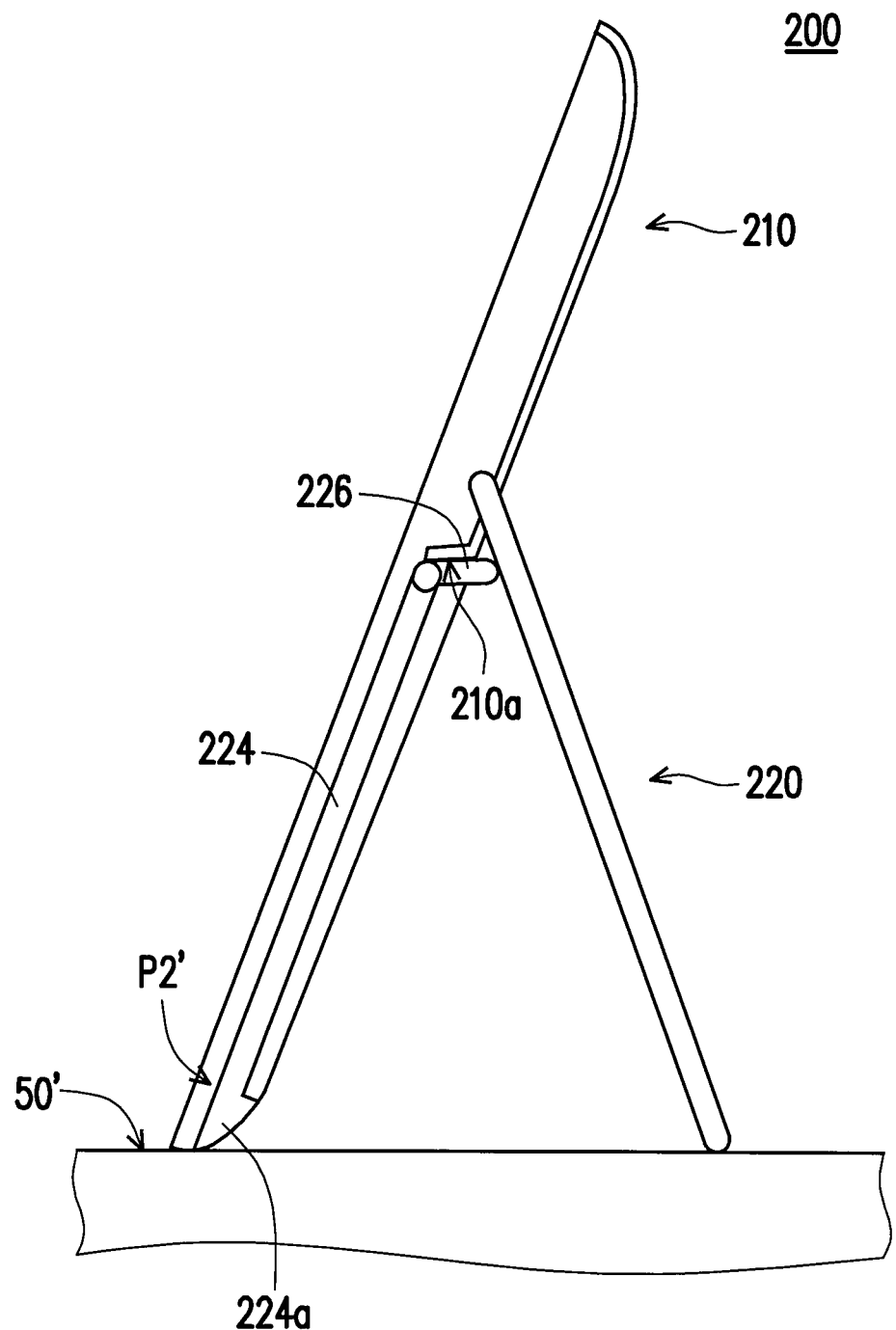
FIG. 5 is a schematic view showing the supporting component of FIG. 4 expanded from the main body.

FIG. 4 is a schematic view of an electronic device of another embodiment of the invention. FIG. 5 is a schematic view showing the supporting component of FIG. 4 expanded from the main body. In the electronic device 200 and stand module 220 of FIG. 4 and FIG. 5, the configuration and actuating methods of the main body 110, the supporting component 222, the sliding component 224, the work surface 50', the first position P1', and the second position P2' are similar to the configuration and actuating methods of the main body 110, the supporting component 122, the sliding component 124, the work surface 50, the first position P1, and the second position P2 of the above embodiment. The same description will not be repeated herein. The difference between the electronic device 200 and the stand module 220, and the electronic device 100 and the stand module 120, is that the prop 226 of the stand module 220 is pivoted to the sliding component 224. When the sliding component 224 receives at external force from the working surface 50' and slides inside the main body 210, the prop 226 as shown in FIG. 5 rotates with respect to the sliding component 224 to push the supporting component 222. In detail, the main body 210 includes a guiding tilted surface 210*a*. The sliding component 224 sliding to the second position P2' is adapted to drive the prop 226 to be guided by the guiding tilted surface 210*a* to guide and push the supporting component 222. In other embodiments, other suitable structures may guide the prop 226, and the invention is not limited thereto.

Figure 6:
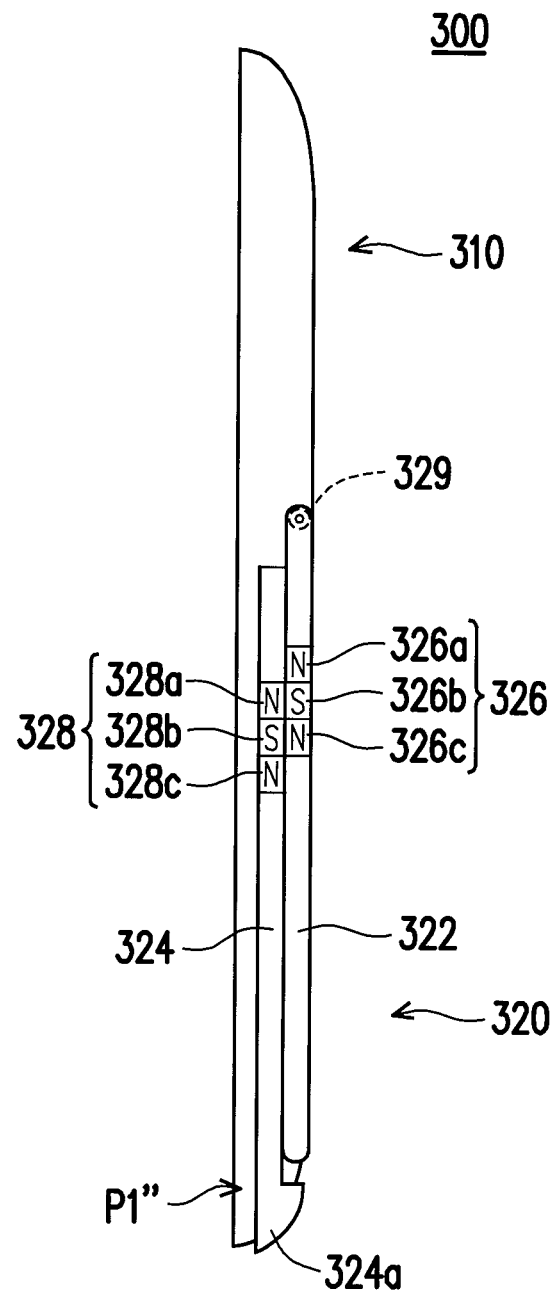
FIG. 6 is a schematic view of an electronic device of another embodiment of the invention.
Figure 7:
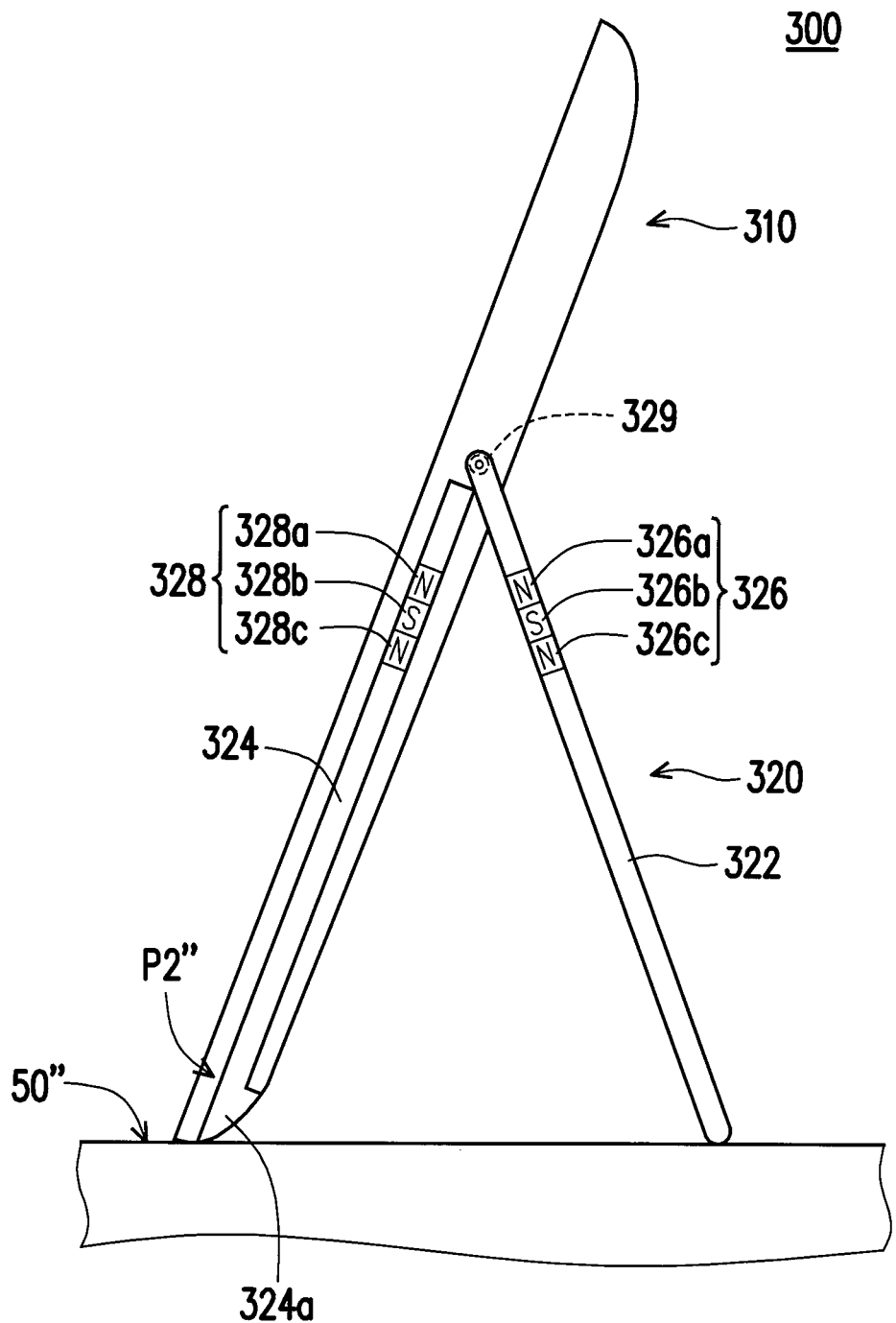
FIG. 7 is a schematic view showing the supporting component of FIG. 6 expanded from the main body.

FIG. 6 is a schematic view of an electronic device of another embodiment of the invention. FIG. 7 is a schematic view showing the supporting component of FIG. 6 expanded from the main body. In the electronic device 300 and stand module 320 of FIG. 6 and FIG. 7, the configuration and actuating methods of the main body 310, the supporting component 322, the sliding component 324, the work surface 50", the first position P1", and the second position P2" are similar to the configuration and actuating methods of the main body 110, the supporting component 122, the sliding component 124, the work surface 50, the first position P1, and the second position P2 of the above embodiment. The same description will not be repeated herein. The difference between the electronic device 300 and the stand module 320, and the electronic device 100 and the stand module 120, is that stand module 320 includes a magnetic component 326 and a magnetic component 328. The magnetic component 326 and the magnetic component 328 are respectively disposed in the supporting component 322 and the sliding component 324. The sliding component 324 in the first position P1" is adapted to restrict the supporting component 322 to be retracted to the main body 310 as shown in FIG. 6 by a magnetic attraction between the magnetic component 326 and the magnetic component 328. The sliding component 324 in the second position P2" is adapted to restrict the supporting component 322 to be expanded from the main body 310 as shown in FIG. 7 by a magnetic repulsion between the magnetic component 326 and the magnetic component 328.

In detail, the magnetic component 326 includes the magnetic parts 326*a*, 326*b*, 326*c*, and the magnetic component 328 includes the magnetic parts 328*a*, 328*b*, 328*c*. The magnetic parts 326*a*, 326*c*, 328*a*, 328*c* have magnetic poles that are N poles, and the magnetic parts 326*b*, 328*b* have magnetic poles that are S poles. When the sliding component 324 is in the first position P1" as seen in FIG. 6, the magnetic parts 326*b*, 326*c* respectively align opposite to the magnetic parts 328*a*, 328*b*. Thus, the magnetic attraction is generated between the magnetic component 326 and the magnetic component 328. When the sliding component 324 is in the second position P2" as seen in FIG. 7, the magnetic parts 326*a*, 326*b*, 326*c* respectively align opposite to the magnetic parts 328*a*, 328*b*, 328*c*. Thus, the magnetic repulsion is generated between the magnetic component 326 and the magnetic component 328. In other embodiments, other suitable magnetic arrangements and configurations or methods may generate the magnetic attraction and magnetic repulsion, and the invention is not limited thereto. The stand modules 120, 220 of the previous embodiments may also include the magnetic components to restrict the position of the supporting components according to need. The invention is not limited thereto.

In the embodiment, the stand module 320 includes an elastic component 329. The elastic component 329 is, for example, a torsion spring connected to pivoting portion of the supporting component 322. The supporting component 322 in the expanded state is adapted to be retracted to the main body 310 by the elasticity of the elastic component 329. In detail, the elastic component 329 is configured to contact the main body 310 and provide an elastic force when the expanding angle of the supporting component 322 is greater than a predetermined value. This prevents the retracted supporting component 322 in the main body 310 from being difficult to expand because of the elastic force of the elastic component 329. The stand modules 120, 220 of the previous embodiments may also include the elastic component to provide an elastic force so that the supporting component retracts to the main body. The invention is not limited thereto.

Besides using the props 126, 226 and the magnetic components 326, 328 to drive the supporting component to actuate, in other embodiments, the structure of the sliding component itself may further drive the supporting component to actuate. For example, the sliding component may include a protruding portion. The sliding component is adapted to slide and drive the protruding portion to push the supporting component, so that the supporting component is expanded from the main body.

To sum up, in the electronic device of the invention, the stand module includes a sliding component corresponding to a supporting component. When the user places the main body of the electronic device on a working surface so that sliding component of the stand module contacts the working surface, the sliding component is pushed by the working surface so as to move upwards towards the inside of the main body and drive the supporting component. This way the supporting component expands to support the main body on the working surface. In addition, when the main body and the end of the sliding component are taken off the work surface, the sliding component moves downwards towards the outside of the main body by gravity, and the supporting component retracts to the main body by gravity. Thus, the user only needs to place the main body of the electronic device on the working surface, and the stand module will automatically drive the supporting component to expand. In addition, the user only needs to separate the main body of the electronic device from the working surface, and the supporting component will automatically retract. Thus, the user of the electronic device with the stand module is more convenient.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An electronic device, comprising:
   a main body; and
   a stand module, comprising:
   a supporting component, pivoted to the main body;
   a sliding component, slidably disposed to the main body and having an end, wherein the sliding component is adapted to slide to a first position such that the end protrudes out of the main body, the end is adapted to receive an external force to move inside the main body, such that the sliding component slides to a second position and drives the supporting component to expand from the main body; and
   a prop, connected to the sliding component, wherein the sliding component is adapted to slide to the second position to drive an inclined surface of the prop to push the supporting component, so that the supporting component expands from the main body.

2. The electronic device as claimed in claim 1, wherein the main body is adapted to be placed on a work surface such that the work surface applies the external force towards the end, and the supporting component expanded from the main body is adapted to support the main body on the work surface.

3. The electronic device as claimed in claim 2, wherein when the main body and the end of the sliding component are separated from the work surface, the sliding component automatically slides from the second position to the first position by gravity, and the supporting component automatically retracts to the main body by gravity.

4. The electronic device as claimed in claim 1, wherein the sliding component is adapted to slide from the second position to the first position by gravity, so that the supporting component is released by the sliding component to retract to the main body.

5. The electronic device as claimed in claim 1, wherein the supporting component is adapted to retract to the main body by gravity so as to drive the sliding component to slide from the second position to the first position.

6. The electronic device as claimed in claim 1, wherein the main body comprises at least one sliding slot and at least one guiding slot, the guiding slot is tilted with respect to the sliding slot, the sliding component is slidably disposed at the sliding slot, the prop is slidably disposed at the guiding slot and props against the sliding component, and the sliding component sliding toward the second position is adapted to drive the prop to be guided by the guiding slot to push the supporting component.

7. The electronic device as claimed in claim 6, wherein the stand module comprises at least one column, the at least one column passes through the sliding slot to be connected to the sliding component.

8. The electronic device as claimed in claim 6, wherein the stand module comprises at least one column, the at least one column passes through the guiding slot to be connected to the prop.

9. The electronic device as claimed in claim 1, wherein the prop is pivoted to the sliding component and is adapted to rotate with respect to the sliding component and push the supporting component.

10. The electronic device as claimed in claim 1, wherein the main body comprises a guiding tilted surface, and the sliding component sliding to the second position is adapted to drive the prop to be guided by the guiding tilted surface to push the supporting component.

11. The electronic device as claimed in claim 1, wherein the stand module comprises two magnetic components, the two magnetic components are respectively disposed on the sliding component and the supporting component, the sliding component in the first position is adapted to restrict the supporting component to be retracted to the main body by a magnetic attraction between the two magnetic components, and the sliding component in the second position is adapted to restrict the supporting component to be expanded from the main body by a magnetic repulsion between the two magnetic components.

12. The electronic device as claimed in claim 1, wherein the stand module comprises an elastic component, the elastic component is connected to the supporting component, and the supporting component is adapted to be retracted to the main body by the elasticity of the elastic component.

13. The electronic device as claimed in claim 1, wherein the sliding component comprises a protruding portion, and the sliding component is adapted to slide and drive the protruding portion to push the supporting component, so that the supporting component is expanded from the main body.

14. An electronic device, comprising:
   a main body; and
   a stand module, comprising:
   a supporting component, pivoted to the main body;
   a sliding component, slidably disposed to the main body and having an end, wherein the sliding component is adapted to slide to a first position such that the end protrudes out of the main body, the end is adapted to receive an external force to move inside the main body, such that the sliding component slides to a second position and drives the supporting component to expand from the main body; and
   a prop, connected to the sliding component, wherein the sliding component is adapted to slide to the second position to drive the prop to push the supporting component, so that the supporting component expands from the main body,
   wherein the prop is pivoted to the sliding component and is adapted to rotate with respect to the sliding component and push the supporting component.

15. An electronic device, comprising:
   a main body; and
   a stand module, comprising:
   a supporting component, pivoted to the main body;

a sliding component, slidably disposed to the main body and having an end, wherein the sliding component is adapted to slide to a first position such that the end protrudes out of the main body, the end is adapted to receive an external force to move inside the main body, such that the sliding component slides to a second position and drives the supporting component to expand from the main body; and two magnetic components, respectively disposed on the sliding component and the supporting component, wherein the sliding component in the first position is adapted to restrict the supporting component to be retracted to the main body by a magnetic attraction between the two magnetic components, and the sliding component in the second position is adapted to restrict the supporting component to be expanded from the main body by a magnetic repulsion between the two magnetic components.

\* \* \* \* \*